United States Patent [19]

Frazier et al.

[11] Patent Number: 5,526,972
[45] Date of Patent: Jun. 18, 1996

[54] SPACE ORGANIZER FOR TRUCK BED TRAYS AND AUTOMOBILE TRUNKS

[76] Inventors: Richard K. Frazier; Barry V. Davis, both of 1 Research Drive, Dartmouth, Nova Scotia, Canada, B2Y4M9

[21] Appl. No.: 408,039

[22] Filed: Mar. 21, 1995

[51] Int. Cl.⁶ .............................. B60R 7/00; B60R 9/00; B60R 11/00
[52] U.S. Cl. .................. 224/539; 224/402; 224/403; 224/549; 224/311; 224/925; 220/529; 220/531; 220/530; 220/542; 296/37.1; 296/37.5; 296/37.6
[58] Field of Search .................... 224/402, 403, 224/539, 542, 543, 549, 311, 566, 925; 296/37.1, 37.5, 37.6; 220/520, 529, 531, 536, 542, 545, 557; 211/85

[56] References Cited

U.S. PATENT DOCUMENTS

| | | | |
|---|---|---|---|
| 4,189,056 | 2/1980 | Majewski | 211/195 |
| 4,226,348 | 10/1980 | Dotter et al. | 224/42.42 |
| 4,718,584 | 1/1988 | Schoeny | 224/42.42 |
| 4,746,041 | 5/1988 | Cook et al. | 224/42.42 |
| 4,749,226 | 6/1988 | Heft | 296/37.6 |
| 4,828,312 | 5/1989 | Kinkel et al. | 296/37.6 |
| 4,875,730 | 10/1989 | Justice | 296/37.5 |
| 4,911,296 | 3/1990 | Hart, Jr. | 224/542 |
| 4,917,429 | 4/1990 | Giger | 224/543 |
| 5,025,964 | 6/1991 | Phirippidis | 224/542 |
| 5,129,612 | 7/1992 | Beaupre | 248/166 |
| 5,207,260 | 5/1993 | Commesso | 160/135 |

FOREIGN PATENT DOCUMENTS

| | | | |
|---|---|---|---|
| 4015556 | 11/1990 | Germany | 296/37.5 |
| 2229982 | 10/1990 | United Kingdom . | |
| 2249767 | 5/1992 | United Kingdom . | |

Primary Examiner—Henry J. Recla
Assistant Examiner—Timothy L. Maust
Attorney, Agent, or Firm—Ronald P. Kananen

[57] ABSTRACT

In order to partition a storage area of a vehicle so that bags of groceries and the like can be arranged in a neat orderly manner, a space organizer includes a backboard which extends laterally across the storage area and at least two wing-like partition members which can be either fixed or hinged and which partition a given area of the storage area into three cells or sub-areas for bags and the like. A lid member can be provided to enclose at least the top of the center cell and in the case where the partition members are hingedly connected to the backboard a bungee cord can be used to retain the two partition members in desired space dividing positions.

7 Claims, 3 Drawing Sheets 5,526,972

SPACE ORGANIZER FOR TRUCK BED TRAYS AND AUTOMOBILE TRUNKS

BACKGROUND OF THE INVENTION

1. Field of the Invention

The present invention relates generally to a space organizing partition arrangement for use in the rear of pickup trucks, station wagons, minivans and the trunks of automotive vehicles. More specifically, the present invention relates to a collapsible partition arrangement which allows the space in the storage areas of automotive vehicles to be separated into spaces suited for restraining, protecting and keeping bags of groceries and other packages in a neat orderly and accessible manner.

2. Description of the Related Art

Various space organizing arrangements have been proposed for use in the trunks and storage areas of automotive vehicles. Examples of such structures can be found in U.S. Pat. No. 4,718,584 issued on Jan. 12, 1988 in the name of Schoeny and in German Offenlegungsschrift DE 40 15 556 A1. The first of these arrangements however, tends to be overly complex and difficult to adapt to a large number of different vehicular environments. On the other hand, the second of these two arrangements, while being simpler makes use of a spring loaded hook arrangement for allowing disconnecting partitioning members to be partially disconnected from a main board member, in a manner which allows the whole arrangement to be laid out flat. Accordingly, there has been a need for a robust arrangement which can readily be used in a number of different types of vehicle and which advantageously can be folded up and put away with the very minimum of trouble and effort.

SUMMARY OF THE INVENTION

It is an object of the present invention to provide a space organizer which can be readily set in a number of different vehicular environments.

It is a further object to provide a space organizer which is robust and which can be folded and unfolded with the very minimum of effort and trouble and placed in position in a vehicular storage area ready for instant use.

It is a further object of the present invention to provide a space organizer which has a cover which encloses at least a part of the space which is partitioned by the space organizer and which improves the amount of protection afforded whatever is placed in the enclosed space.

In brief, the above objects are achieved by a space organizer which includes a backboard that extends laterally across the vehicle storage area and at least two wing or partition members which can be either fixed or hinged and which partition a given area of the storage area into three cells or sub-areas for bags and the like. A lid or cover member can be provided to enclose at least the top of the center cell and in the case the wing members are hingedly connected to the backboard, a bungee cord or suitable spring arrangement can be used to retain the two members in desired space dividing positions.

More specifically, a first aspect of the invention resides in a space organizer for partitioning the space in the storage area of a vehicle comprising: a backboard which extends across the vehicle storage space; first and second partition members, each of the first and second partition members being hingedly connected to the backboard by first and second hinge members so as to be pivotal between a first position wherein they extend perpendicularly to the backboard and a second position wherein they lay flat against the backboard; first and second clips disposed at first and second ends of the backboard, the first and second clips being arranged to engage the first and second partition members when they assume their respective second positions and resiliently hold the first and second partition members in their respective second positions; and resilient means for producing a bias which tends to rotate the first and second partition means about the first and second hinge member and for holding the first and second partition members in their respective first positions.

A second aspect of the present invention resides in a space organizer for partitioning the space in the storage area of a vehicle comprising: a backboard which extends across the vehicle storage space; first and second partition members, each of the first and second partition members being permanently and rigidly connected to the backboard and arranged to extend perpendicularly to the backboard; and means defining hand grip apertures in the backboard on either side of the first and second partition members.

BRIEF DESCRIPTION OF THE DRAWINGS

The present invention will become more clearly appreciated as a description of the preferred embodiment is made with reference to the appended drawings in which.

DETAILED DESCRIPTION OF THE PREFERRED EMBODIMENTS

Figure 1:
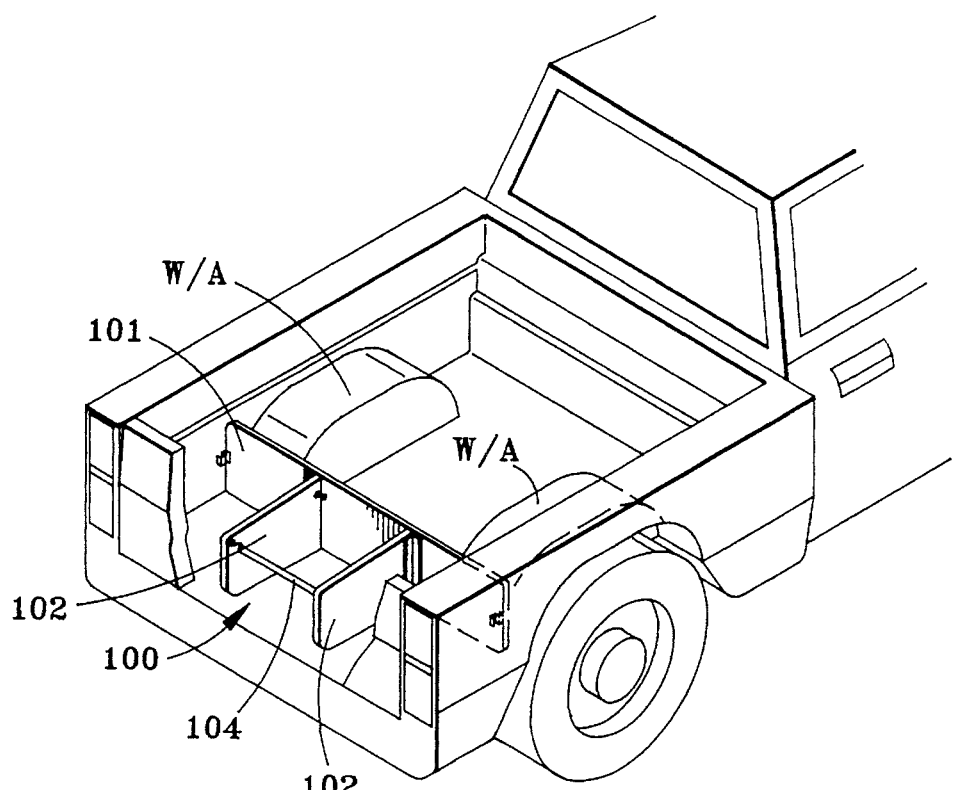
FIG. 1 is a perspective view showing a first embodiment of the present invention deployed in the back of a pick-up truck.
Figure 2:
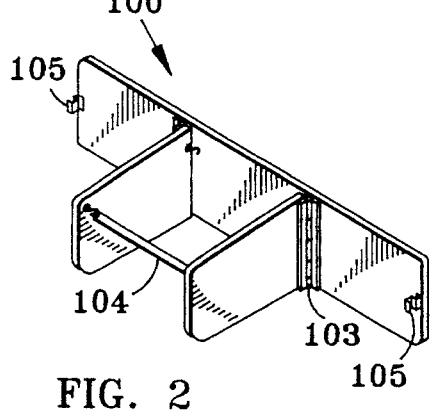
FIG. 2 is a perspective view showing the space organizer according to the first embodiment in a fully unfolded condition.
Figure 3:
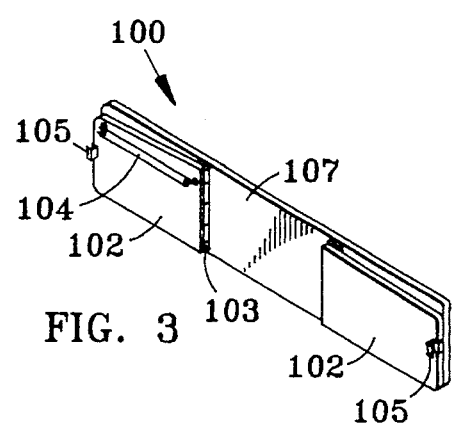
FIG. 3 is a perspective view showing the space organizer according to the first embodiment in a fully folded condition.

A first embodiment of the present invention is shown in FIGS. 1 to 6. This arrangement features a space organizer structure 100 composed of three basic elements, a backboard 101 which is arranged to extend laterally across the rear floor of a pick-up truck bed, minivan or the like, either rear of or forward of the wheel arches, and two vertically oriented wing-like partition members 102, 102. In FIG. 1 the backboard 101 is shown arranged aft of the wheel arches W/A and in abutment with the rear edges of these projections. In FIG. 2 the "wings" 102 (as they will be referred to throughout the specification) are pivotally connected with the backboard 101 by way of hinges 103. The hinges 103 are arranged to allow the partitions 102 to pivot outwardly and to lay flat against the backboard in the manner illustrated in FIG. 3, when not in use. Clips 105 are provided at each end of the backboard and arranged to engage the leading edges of the partitions 102 when they assume a fully folded state and thus hold the space organizer 100 in a rattle free and easy to handle condition.

Figure 4:
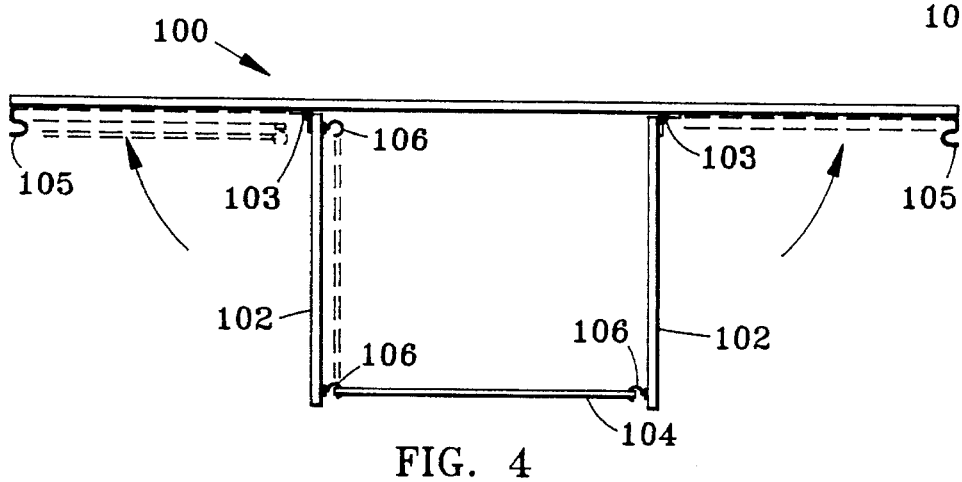
FIG. 4 is a plan view showing the space organizer according to the first embodiment in a fully unfolded condition.
Figure 5:
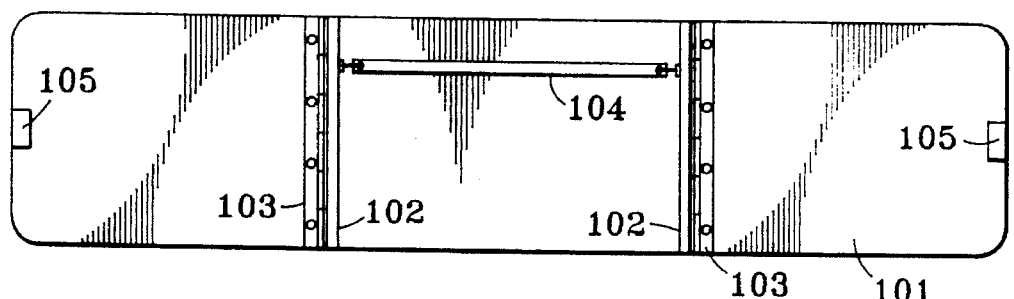
FIG. 5 is an elevational view of the space organizer shown in FIG. 4.
Figure 6:
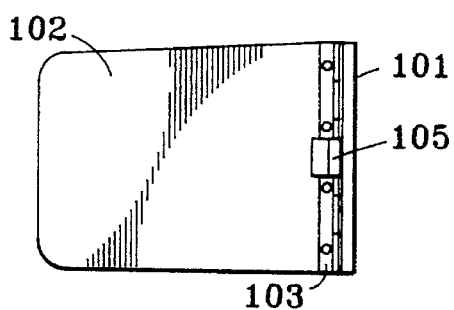
FIG. 6 is a side elevational view of the space organizer according to a first embodiment of the invention.

An elastic stretchable bungee cord 104 is provided for holding the partitions 102 in an open state. In FIG. 4 the ends of this cord 104 are provided with eyelets which can be quickly and easily engaged with hooks 106 which are provided on the partitions 102. In this embodiment three hooks 106 are provided, one at each outboard end of the partitions and another at an inboard end of the left hand partition 102. When the space organizer is in use, the bungee cord 104 is connected between the hooks 106 at the outboard ends of the partitions 102 in the manner illustrated in FIGS. 1, 2, 4 and 5. On the other hand, in FIG. 3 when the spacer is not in use and is folded up, the cord 104 can be connected to the hooks 106 which are provided on the same partition 102 and thus conveniently keep it out of harms way and simultaneously preventing it from becoming lost. As the bungee cord 104 is provided with eyelets at both ends it is readily replaceable in case of breakage.

In this embodiment the hinges 103 are conveniently arranged to limit pivotal movement of the partitions 102 after they reach positions wherein they are essentially perpendicular to the backboard and thus act as stoppers which hold partitions 102 in position wherein they can be tethered with the bungee cord 104.

Figure 7:
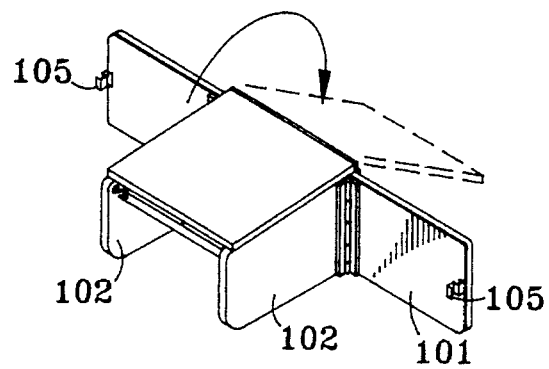
FIG. 7 is a perspective view showing a second embodiment of the invention which is provided with a hinged top which is provided to protect the contents of the organizer from external influences.
Figure 8:
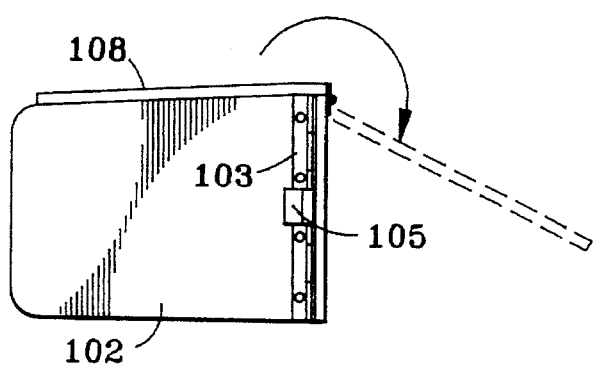
FIG. 8 is a side elevational view of the second embodiment.

A second embodiment shown in FIGS. 7 and 8 features the provision of a hinged top 108 which can be flipped over the top of the center space or cell defined between the partitions 102 and thus enclose this cell in a manner which protects the contents thereof from unnecessary exposure. In this embodiment the hinged top 108 is arranged to be movable from the position illustrated in solid line in FIGS. 7 and 8, to the position shown in broken line. Limiting the amount of pivotal movement of the top 108 to the position shown in broken line is such as to allow a person to readily regain a grasp on the lid and not have to reach completely over the top of the backboard when it is desired to close the cell again.

It is worth noting at this point that all of the embodiments feature rounded corners on the backboard 101 and partitions 102, in order to prevent injuries and to improve the appearance of the unit. Further, in at least the second embodiment, it is possible that the partitions 102 have sloping upper edges so as to allow the lid 108 to fold a little further past horizontal to ensure that gravity holds the lid closed and provides slightly improved concealment of the items which are located in the center cell.

The present invention is of course not limited to a lid which closes only the center cell and additional lids can be provided by the adjacent side cells or a single wide lid be provided for all three.

Figure 9:
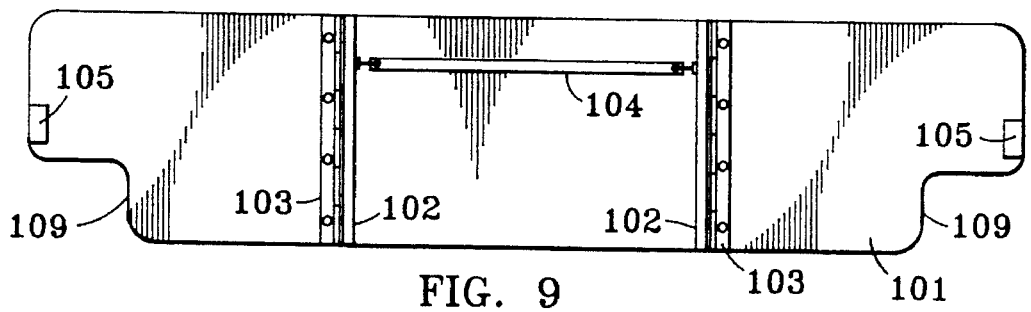
FIG. 9 is a front elevational view of a third embodiment of the invention which is provided with cut-outs that are arranged to receive the wheel arch housings which often protrude into the storage areas of automotive vehicles.

FIG. 9 shows a third embodiment of the invention. This embodiment features cut-out portions 109 which are formed at the lower corners of the backboard and which are shaped and sized to allow the backboard to be pushed back so as to extend partially over the wheel arches W/A of the vehicle (see FIG. 1). These cut-outs 109 also provide convenient hand holds which facilitate disposition and removal of the spacer unit from trunk spaces of sedan type vehicles for example.

Figure 10:
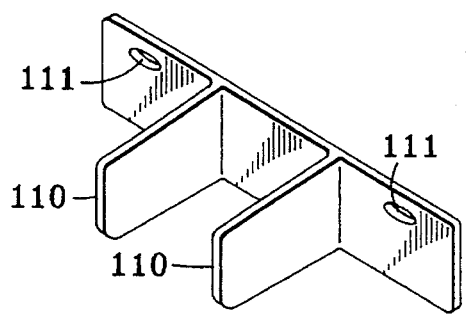
FIG. 10 is a perspective view showing a fourth non-collapsible embodiment of the invention.
Figure 11:
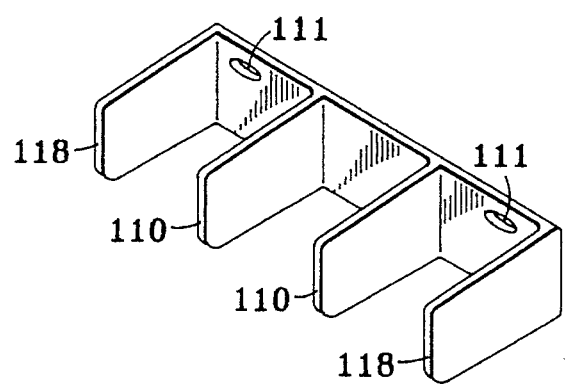
FIG. 11 is a perspective view of a fifth embodiment of the invention.

FIG. 10 shows a fourth non-collapsible embodiment of the invention. In this case the spacer organizer unit is molded from plastic and has permanently extending partitions 110 and conveniently placed openings 111 to allow for easy handling. FIG. 11 shows a fifth embodiment which is essentially similar to the fourth embodiment and differs only in that additional partitions 118 are provided at each end of the backboard to increase the number of cells which are provided for storage and support of various items and parcels.

Figure 12:
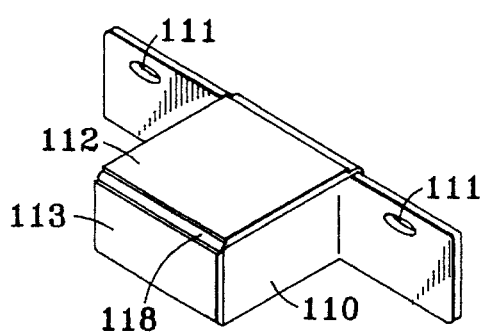
FIG. 12 is a perspective view of a sixth embodiment of the invention which features a foldable cover arrangement which permits at least one of the cells formed by the space organizer to be enclosed.
Figure 13:
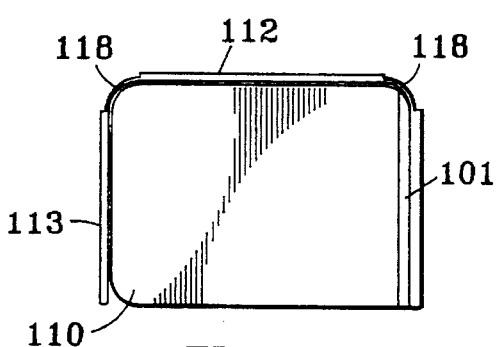
FIG. 13 is a side elevational view showing the foldable cover of the sixth embodiment folded into a cell enclosing position.
Figure 14:
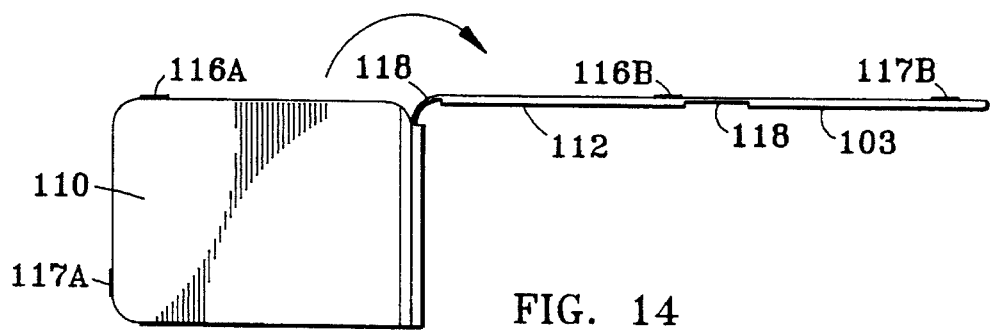
FIG. 14 shows the sixth embodiment of the invention with the foldable cover in a fully open and extended condition.

FIGS. 12 to 14 show a sixth embodiment of the present invention. This embodiment is structurally similar to the fourth embodiment and features the provision of integrally molded and hingedly interconnected cover plates 112, 113. These cover plates 112, 113 can be folded from the condition illustrated in FIG. 14 to cover the front and upper openings of the center cell and assume the condition illustrated in FIG. 12. In order to maintain the cover plates in position, "Velcro" brand fasteners 116A, 116B, 117A, 117B can be provided at the illustrated locations. The hinges which interconnect the cover plates comprise flexible strap portions 118 which are formed during the molding process step, and which are each sufficiently long as to flex around the respective rounded corners of the partitions 110.

Alternative arrangements can include the use of a cover arrangement formed of a flexible water proof material which is suitably stiffened with a wire surround and attached with press buttons or velcro™ to keep it in place.

In the case of the embodiments which feature pivotal partitions, it is within the scope of the present invention to provide springs, such as torsion springs for example, which, once the clips are released, would swing the partitions to their space dividing positions and thus obviate the need to provide the bungee cord and hook arrangement.

The length of the backboard 101 in the embodiment shown in FIGS. 12 to 14 can be shortened to the width of the center cell to form what becomes a convenient "roll up" type of storage box which can be disposed in a corner of the vehicle storage area.

It goes without saying that various logos and the like such as "MR. GROCERY" or "EASY STORE" can be embossed on suitable locations on the space organizer. Personal or company names, symbols or logos can be added or embossed in place of above mentioned ones if so desired.

Although the invention has been described by reference to only six different embodiments, it is to be understood that various changes and modifications may be effected without departing from the scope of the invention which is intended to be limited only by the appended claims.

What is claimed is:

1. A space organizer for partitioning the space in the storage area of a vehicle comprising:

a backboard which is adapted to extend across the vehicle storage space;

first and second partition members, respectively, each of said first and second partition members being hingedly connected to said backboard by first and second hinge members so as to be pivotal between a first position limiting their movement to be perpendicular to said backboard and a second position wherein they lay flat against said backboard;

first and second clips disposed at first and second ends of said backboard, said first and second clips being arranged to engage said first and second partition members when they assume their respective second positions and resiliently hold said first and second partition members in their respective second positions; and resilient means for producing a bias which tends to rotate said first and second partition members about said first and second hinge members and for holding said first and second partition members in their respective first positions.

2. A space organizer as set forth in claim 1, wherein said biasing means comprises an elastic cord which is stretched between and releasably connected to end portions of each of said first and second partition members.

3. A space organizer as set forth in claim 2, further comprising first and second hooks, said first and second hooks being attached to said first and second partition members respectively, said elastic cord having connectors at each end which detachably engage said first and second hooks.

4. A space organizer as set forth in claim 1, wherein said hinge members are arranged to permit each of said first and second partition members to rotate through approximately 90° from second position toward said first position, said each of first and second partition members having an edge portion which abuts against said backboard in its respective first position.

5. A space organizer as set forth in claim 1, wherein said backboard is formed with first and second cut-out portions which are adapted to allow portions of wheel arches which extend into the vehicle storage area to pass therethrough and for the backboard to be located at a position wherein it extends over portions of the wheel arches.

6. A space organizer as set forth in claim 1, further comprising a lid member which is hingedly connected to an upper edge of said backboard and which is pivotal through an angle of at least 180° between a first position wherein it rests on the tops of said first and second partitions and a second position wherein it assumes a predetermined angle with respect to said backboard.

7. A space organizer as set forth in claim 1 further comprising cover means, said cover means including at least one hinged cover member which is adapted to lay on an edge portion of each of said first and second partition members 102 so as to at least partially close off a portion of the space defined between said first and second partition members.

* * * * *